US009323855B2

(12) United States Patent
Hochmuth et al.

(10) Patent No.: US 9,323,855 B2
(45) Date of Patent: *Apr. 26, 2016

(54) PROCESSING MEDIA ITEMS IN LOCATION-BASED GROUPS

(71) Applicant: Facebook, Inc., Menlo Park, CA (US)

(72) Inventors: Gregor Hochmuth, San Francisco, CA (US); Tim Van Damme, San Francisco, CA (US); Philip McAllister, San Francisco, CA (US); Kevin Systrom, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/759,948

(22) Filed: Feb. 5, 2013

(65) Prior Publication Data

US 2014/0222809 A1    Aug. 7, 2014

(51) Int. Cl.
*G06F 17/30* (2006.01)

(52) U.S. Cl.
CPC .................. *G06F 17/3087* (2013.01)

(58) Field of Classification Search
CPC ............................... G06F 17/30864
USPC ......................................... 707/736
See application file for complete search history.

(56) References Cited

U.S. PATENT DOCUMENTS

| | | | |
|---|---|---|---|
| 7,461,099 B1* | 12/2008 | Sharpe et al. | |
| 7,522,701 B2* | 4/2009 | Jensen et al. | 378/62 |
| 8,332,402 B2* | 12/2012 | Forstall et al. | 707/736 |
| 8,584,015 B2* | 11/2013 | Osten | 715/731 |
| 8,626,699 B2* | 1/2014 | Xie et al. | 706/58 |
| 8,712,192 B2* | 4/2014 | Thota | 382/305 |
| 8,743,411 B2* | 6/2014 | Bachman et al. | 358/1.18 |
| 8,880,535 B1 | 11/2014 | Agarwal et al. | |
| 2002/0019224 A1* | 2/2002 | Meyers | 455/412 |
| 2004/0218894 A1 | 11/2004 | Harville et al. | |
| 2004/0225635 A1* | 11/2004 | Toyama et al. | 707/1 |
| 2007/0271297 A1 | 11/2007 | Jaffe et al. | |
| 2008/0232695 A1* | 9/2008 | Noda et al. | 382/224 |
| 2010/0171763 A1 | 7/2010 | Bhatt et al. | |
| 2012/0096361 A1* | 4/2012 | Osten | 715/731 |

(Continued)

OTHER PUBLICATIONS

Davide Carboni, Stefano Sanna, and Pietro Zanarini, titled GeoPix: Image Retrieval on the Geo Web, from Camera Click to Mouse Click, published 2006, In Proceedings of the 8th conference on Human-computer interaction with mobile devices and services, MobileHCI '06, ACM, pp. 169-172, hereinafter GeoPix.*

(Continued)

*Primary Examiner* — Rehana Perveen
*Assistant Examiner* — Hicham Skhoun
(74) *Attorney, Agent, or Firm* — Van Pelt, Yi & James LLP

(57) ABSTRACT

Processing a plurality of media items that are associated with a respective plurality of locations includes: obtaining the plurality of media items; selecting a first media item that defines a first region on a map; determining a first set of media items that are located within the first region; selecting a second media item that defines a second region on the map, the second media item being selected among media items that are not located within the first region; determining a second set of media items that are located within the second region; and processing the first set of media items and the second set of media items as distinct groups.

23 Claims, 12 Drawing Sheets

(56) References Cited

U.S. PATENT DOCUMENTS

2014/0040774 A1* 2/2014 Charytoniuk et al. ........ 715/753
2014/0088861 A1 3/2014 Nash

OTHER PUBLICATIONS

Alexandar Jaffe, Mor Naaman, Tamir Tassa, and Marc Davis, Generating Summaries and Visualization for Large Collections of Geo-Referenced Photographs, 2006, In Proceedings of the 8th ACM international workshop on Multimedia information retrieval, MIR '06, ACM, p. 89-98.*

Kentaro Toyama, Ron Logan, and Asta Roseway, Geographic Location Tags on Digital Images, 2003, In Proceedings of the eleventh ACM international conference on Multimedia, Multimedia '03, ACM, pp. 156-166.*

Yuri Almeida Lacerda[1,2], Robson Gonçalves Fechine Feitosa[2], Guilherme Álvaro Esmeraldo[2], Cláudio de Souza Baptista[1], Leandro Balby Marinho "Compass Clustering: A New Clustering Method for Detection of Points of Interest Using Personal Collections of Georeferenced and Oriented Photographs", Publication Date Oct. 15, 2012, pp. 281-288.*

Mor Naaman, Yee Jiun Song, Andreas Paepcke, Hector Garcia-Molina, Stanford University, "Automatic Organization for Digital Photographs with Geographic Coordinates" Date of Conference: Jun. 7-11, 2004, pp. 53-62.*

Carboni et al. "Fractal browsing of large geo-referenced picture sets." 2nd International Workshop on Distributed Agent-based Retrieval Tools. 2008.

* cited by examiner

| Id | Geocode | Thumbnail | Location Name |
|---|---|---|---|
| 1 | 37.0804954, -122.403395 (San Francisco) |  | "GG Park" |
| 2 | 37.0862751, -122.408968 (San Francisco) |  | "The Uptown" |
| 3 | 34.077566, -188.474621 (Los Angeles) |  | "Getty Museum" |
| 4 | 29.703225, -95.402956 (Houston) |  | "Alice's House" |
| 5 | 40.643601, -73.782207 (New York City) |  | "Bob's Office" |
| 6 | 37.0862743, -122.408998 (San Francisco) |  | "The Uptown" |
| 7 | 37.0804836, -122.401078 (San Francisco) |  | — |
| 8 | 40.643623, -73.782287 (New York City) |  | "Charlie's Café" |
| ... | ... | ... | |

PROCESSING MEDIA ITEMS IN LOCATION-BASED GROUPS

BACKGROUND

With digital photography gaining popularity, photographers have many choices of photo organizer and image viewer applications. Often, when an application is first installed, a user needs to review and configure existing photos to enable certain features and services, such as a location-based photo map, photo sharing, etc. For example, the user may want to keep photos near certain locations (e.g., home, place of work) private but make photos near certain other locations (e.g., restaurants, parks) public. The existing process of reviewing all the photos together can be time-consuming, especially when the user has a large collection of photos that need to be reviewed and configured. Such burdensome review processes can sometimes discourage the adoption of new applications.

BRIEF DESCRIPTION OF THE DRAWINGS

Various embodiments of the invention are disclosed in the following detailed description and the accompanying drawings.

DETAILED DESCRIPTION

Figure 1:
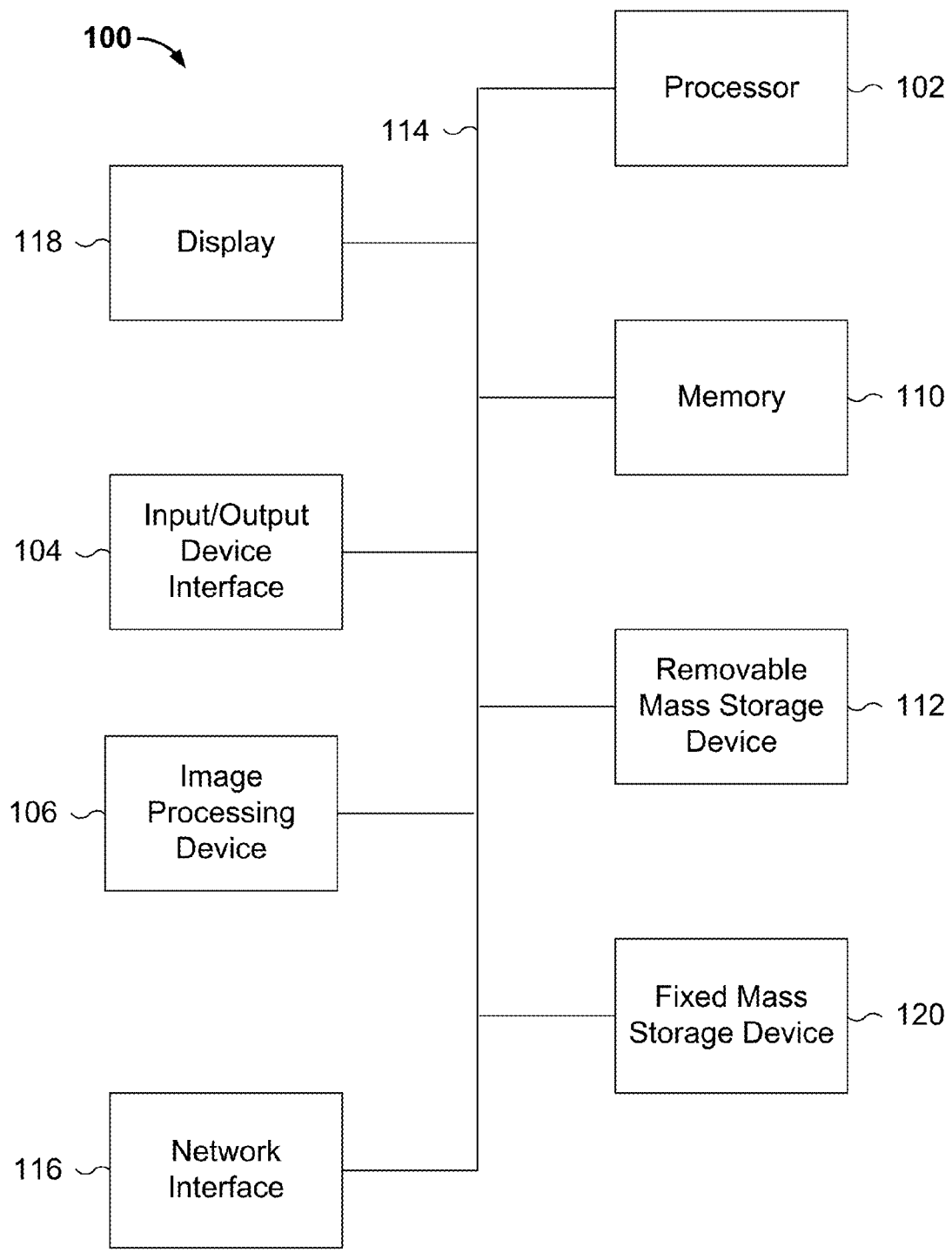
FIG. 1 is a functional diagram illustrating a programmed computer system for processing media items associated with locations in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Processing a plurality of media items (e.g., photos, videos) that are associated with a respective plurality of locations is disclosed. In some embodiments, the plurality of media items is obtained. A first media item that defines a first region on a map is selected. The first media item can be selected according to chronological order, popularity, or other appropriate selection criteria. A first set of media items located within the first region is determined. A second media item that defines a second region on the map is selected among media items that are not located within the first region. A second set of media items located within the second region is determined. Additional media items that define additional regions and their corresponding additional sets of media items that are located in respective additional regions are optionally determined. The first and second sets of media items (as well as any optional additional sets of media items) are processed as distinct groups. For example, location names are determined for sets of media items, and items associated with different location names are displayed to the user in separate groups. In some embodiments, configuration options are presented to the user at a group-level for setting various processing options. For example, each set of media items can be configured to be visible to or hidden from other users and displayed accordingly.

FIG. 1 is a functional diagram illustrating a programmed computer system for processing media items associated with locations in accordance with some embodiments. As will be apparent, other computer system architectures and configurations can be used to perform the described media item processing technique. Computer system 100, which includes various subsystems as described below, includes at least one microprocessor subsystem (also referred to as a processor or a central processing unit (CPU) 102). For example, processor 102 can be implemented by a single-chip processor or by multiple processors. In some embodiments, processor 102 is a general purpose digital processor that controls the operation of the computer system 100. In some embodiments, processor 102 also includes one or more coprocessors or special purpose processors (e.g., a graphics processor, a network processor, etc.). Using instructions retrieved from memory 110, processor 102 controls the reception and manipulation of input data received on an input device (e.g., image processing device 106, I/O device interface 104), and the output and display of data on output devices (e.g., display 118).

Processor 102 is coupled bi-directionally with memory 110, which can include, for example, one or more random access memories (RAM) and/or one or more read-only memories (ROM). As is well known in the art, memory 110 can be used as a general storage area, a temporary (e.g., scratch pad) memory, and/or a cache memory. Memory 110 can also be used to store input data and processed data, as well as to store programming instructions and data, in the form of data objects and text objects, in addition to other data and instructions for processes operating on processor 102. Also as is well known in the art, memory 110 typically includes basic operating instructions, program code, data, and objects used by the processor 102 to perform its functions (e.g., programmed instructions). For example, memory 110 can include any suitable computer readable storage media described below, depending on whether, for example, data access needs to be bi-directional or uni-directional. For example, processor 102 can also directly and very rapidly retrieve and store frequently needed data in a cache memory included in memory 110.

A removable mass storage device 112 provides additional data storage capacity for the computer system 100, and is optionally coupled either bi-directionally (read/write) or uni-directionally (read only) to processor 102. A fixed mass storage 120 can also, for example, provide additional data storage capacity. For example, storage devices 112 and/or 120 can include computer readable media such as magnetic tape, flash memory, PC-CARDS, portable mass storage devices such as hard drives (e.g., magnetic, optical, or solid state drives), holographic storage devices, and other storage devices. Mass storages 112 and/or 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can be used to provide access to other subsystems and devices as well. As shown, these can include a display 118, a network interface 116, an input/output (I/O) device interface 104, an image processing device 106, as well as other subsystems and devices. For example, image processing device 106 can include a camera, a scanner, etc.; I/O device interface 104 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interfaces for interacting with system 100. Multiple I/O device interfaces can be used in conjunction with computer system 100. The I/O device interface can include general and customized interfaces that allow the processor 102 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 116 allows processor 102 to be coupled to another computer, computer network, or telecommunications network using a network connection as shown. For example, through the network interface 116, the processor 102 can receive information (e.g., data objects or program instructions) from another network, or output information to another network in the course of performing method/process steps. Information, often represented as a sequence of instructions to be executed on a processor can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 104 and display 118 share the touch sensitive screen component, which both detect user inputs and display outputs to the user). In addition, bus 114 is illustrative of any interconnection scheme serving to link the subsystems. Other computer architectures having different configurations of subsystems can also be utilized.

Figure 2:
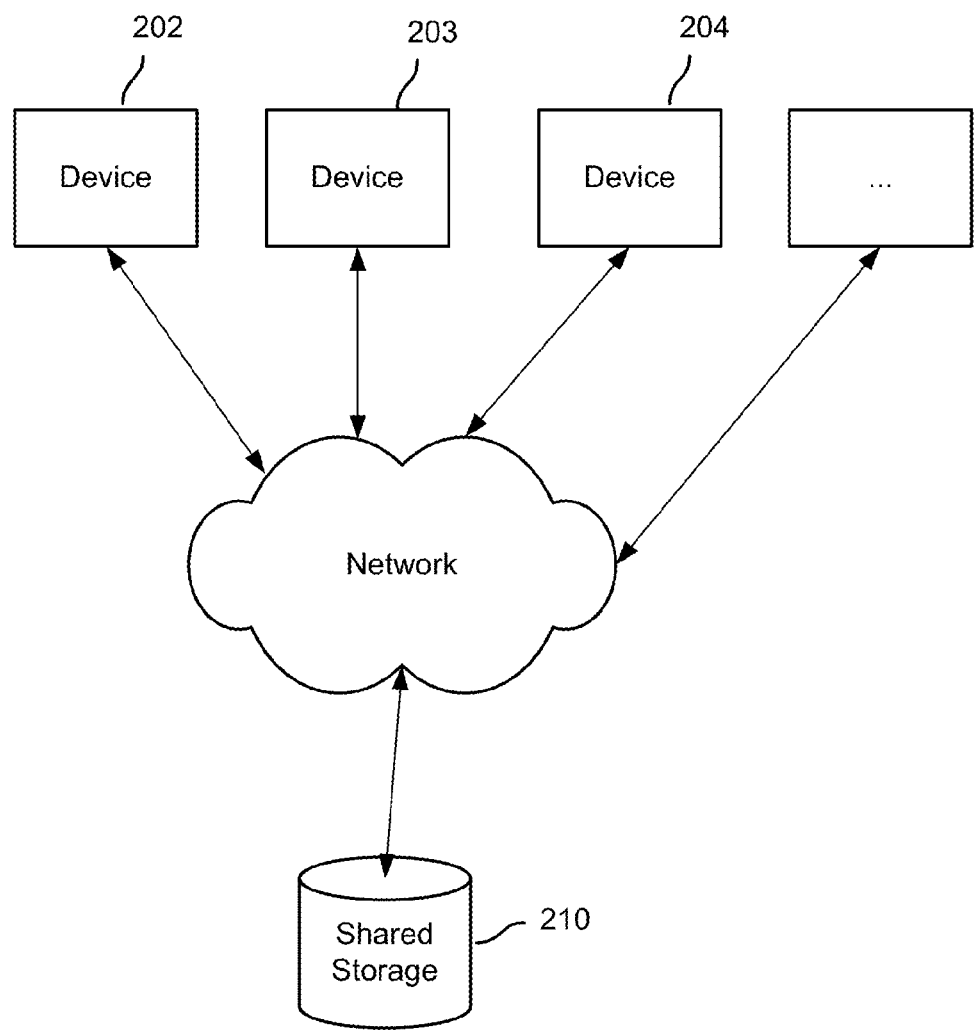
FIG. 2 is a system diagram illustrating an embodiment of a platform for managing media items.

Using a device such as 100, a user can obtain media items stored locally and/or from a networked source, and configure the items. FIG. 2 is a system diagram illustrating an embodiment of a platform for managing media items. In this example, client devices such as 202, 203, 204, etc. are connected to a network. Using a client application (e.g., a stand-alone application or a browser-based application) installed on a client device, a user has the ability to review and configure his collection of media items organized in location-based groups. In some embodiments, the configuration determines whether the items are to be displayed on a map (referred to as a photo map) and viewable by other users of the platform. In some embodiments, media items are stored locally on the devices, which exchange and share content using a peer-to-peer protocol. In some embodiments, the devices are used to upload shared media items to a shared storage device 210 (which can be implemented using one or more servers or databases) and exchange the shared data via the shared storage device.

Figure 3:
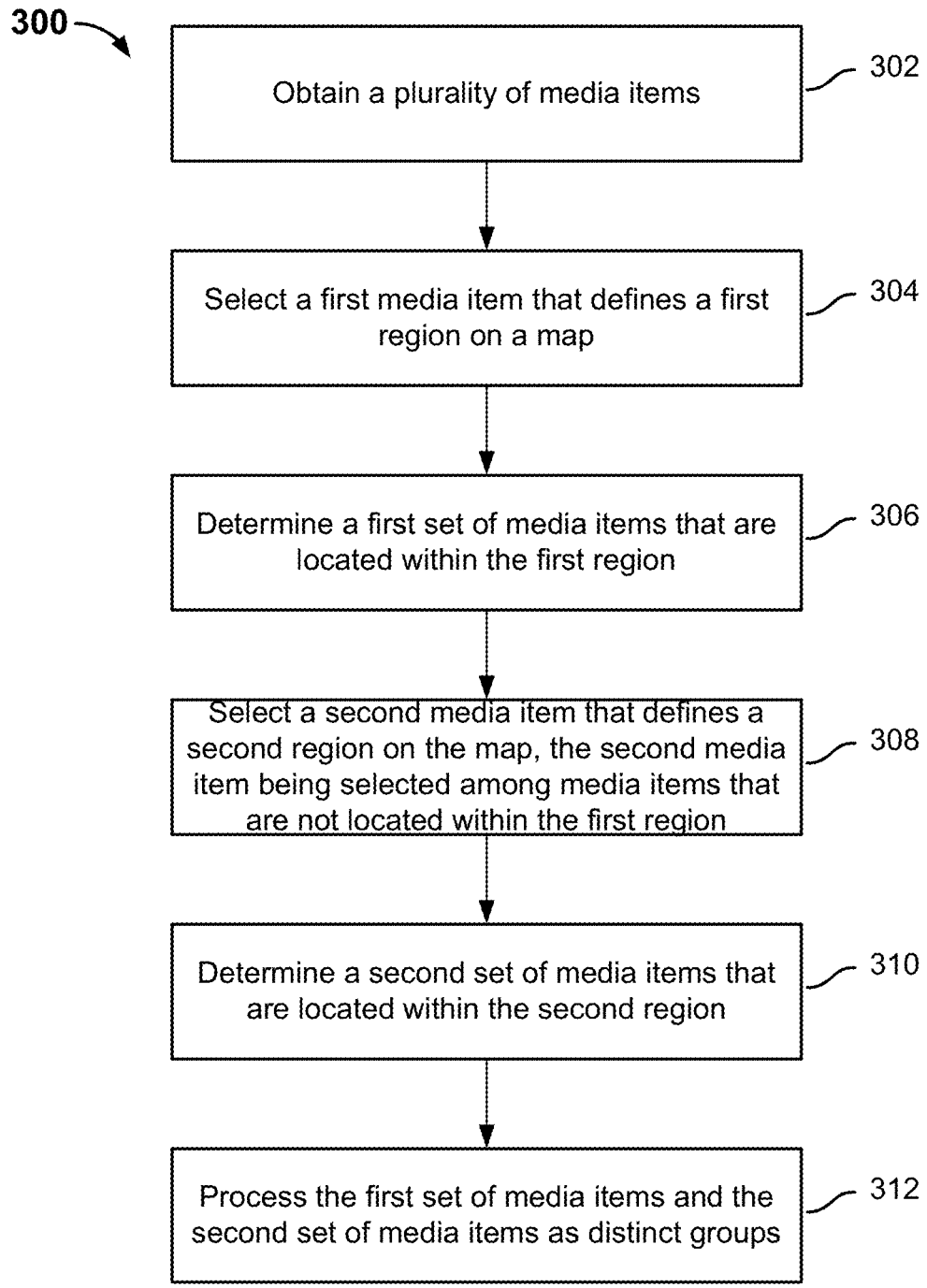
FIG. 3 is a flowchart illustrating an embodiment of a process for processing a plurality of media items grouped by location.

FIG. 3 is a flowchart illustrating an embodiment of a process for processing a plurality of media items grouped by location. In some embodiments, process 300 is implemented on a device such as 100. Process 300 can be invoked during an initialization/configuration stage of an application, such as a media management and editing application. It can also be used to reconfigure or reprocess the media items.

At 302, a plurality of media items is obtained. The plurality of media items can be obtained from a local storage of the device (e.g., from a camera roll application, a directory, or any other appropriate storage location for storing media items locally), or from an external storage location (e.g., from an external drive, a storage device on a network, or any other appropriate location for storing media items externally). In some embodiments, a media item includes the original media object/file and associated metadata information, such as location information (e.g., geocode) of the media item. Optionally, one or more reduced resolution images (e.g., thumbnails) derived based on the original media object/file are also included as a part of the media item.

At 304, a first media item is selected. The first media item defines the first region. In various embodiments, the first media item can be selected arbitrarily among the plurality of media items, or according to certain selection criteria, such as the most recently acquired media item among the plurality of media items (e.g., the photo that was most recently taken), the most popular media item (e.g., the photo that was most viewed by other users or received the most comments or likes from other users), the most surrounded media item (e.g., the media item that has the highest number of adjacent media items within a predefined distance), the most relevant media item (e.g., the photo that was determined to be most interesting to the user based on the user's actions such as the number of times the user has shared the photo with others on a social networking system), or any other appropriate criteria. In some embodiments, the media items are sorted according to the selection criteria (e.g., time, popularity, number of adjacent items, etc.) and the first item in the sorted list is determined to be the first representative media item. The geocode location of the first media item is used to define the first region. In some embodiments, the first region is defined as a circle centered at the geocode location, having a predefined radius (e.g., 250 meters in terms of physical distance.) Regions of other size or shape can be used.

At 306, a first set of media items located within the first region is determined. A number of techniques can be used to make the determination. In some embodiments where the first region is a circle with a predefined radius, the distance between the geocode location of each one of the plurality of media items and that of the first representative media item is compared with the predefined radius to determine whether each media item is within the first region. As will be described in greater detail below, in some embodiments, the media items are organized into a quadtree and the first set of media items is located using a quadtree-based query.

At 308, a second media item that defines a second region on the map is selected among media items that are not located within the first region (in other words, among media items that are not included in the first set.) Similar to the selection of the first media item, the selection of the second media item can also be arbitrary or based on one or more selection criteria such as time, popularity, number of adjacent items, etc. The second media item defines a second region in a manner similar to the way the first media item defines the first region. In some embodiments, the second region is also defined as a circle centered at the location of the geocode, having a predefined radius (e.g., 250 meters.) Regions of other size or shape can be defined.

At 310, a second set of media items located within the second region is determined, using techniques similar to the ones described in step 306.

Steps 308-310 can be repeated for any remaining media items that are not included in the previously determined sets to define additional regions. The remaining media items that belong to the additional regions are determined, thus forming additional sets of media items.

At 312, the first set of media items and the second set of media items (as well as any additional sets of media items, if applicable) are processed as distinct groups. In some embodiments, each set of media items is associated with its own properties, and the processing is performed on a set of media items according to its corresponding properties. Two sets of media items with different properties can therefore be processed differently. In some embodiments, the processing includes associating the sets of media items with location names, presenting a user with the option of associating each set of media items with its own configuration, receiving user specification of the configurations, and configuring each set according to its respective user specified configuration. For example, two sets of media items corresponding to different regions can be presented to the user as two distinct groups, each with their own options for whether to display or share media items in the group. The user can separately specify configuration options for displaying and/or sharing each set of media items (e.g., sharing one set of media items by making them public and visible to other users while keeping another set private), and the application will display or share each set of media items according to user configurations. Other processing can be performed in other embodiments. For example, the user can specify options for filtering, printing, or other appropriate actions to take on each set of media items.

Grouping media items by location and processing them as distinct groups makes it easier for the user to organize and configure the media items, since the user can make a single configuration decision that applies to all the items in a group. Sometimes a user may take many photos over a large area, but with only a few photos in a particular region. For example, a tourist visiting a city may stop at many scenic spots but only take one or two photos in each spot. In such situations, the resulting sets, which may only include one or two photos, can be too numerous to be useful for the final presentation. Thus, in some embodiments, each set is required to have at least a predefined threshold number of media items (e.g., a minimum of 3 media items), and any set that does not meet the requirement is put into a pool to be reclassified into new regions. In some embodiments, after the media items are processed once and sets having a sufficient number of items are formed, the pool is reprocessed according to steps 302-310. This time, the selected media item defines a new region of greater size (e.g., 50 kilometer in radius) so that each new region (and correspondingly each new set) may include a greater number of media items.

Figure 4:
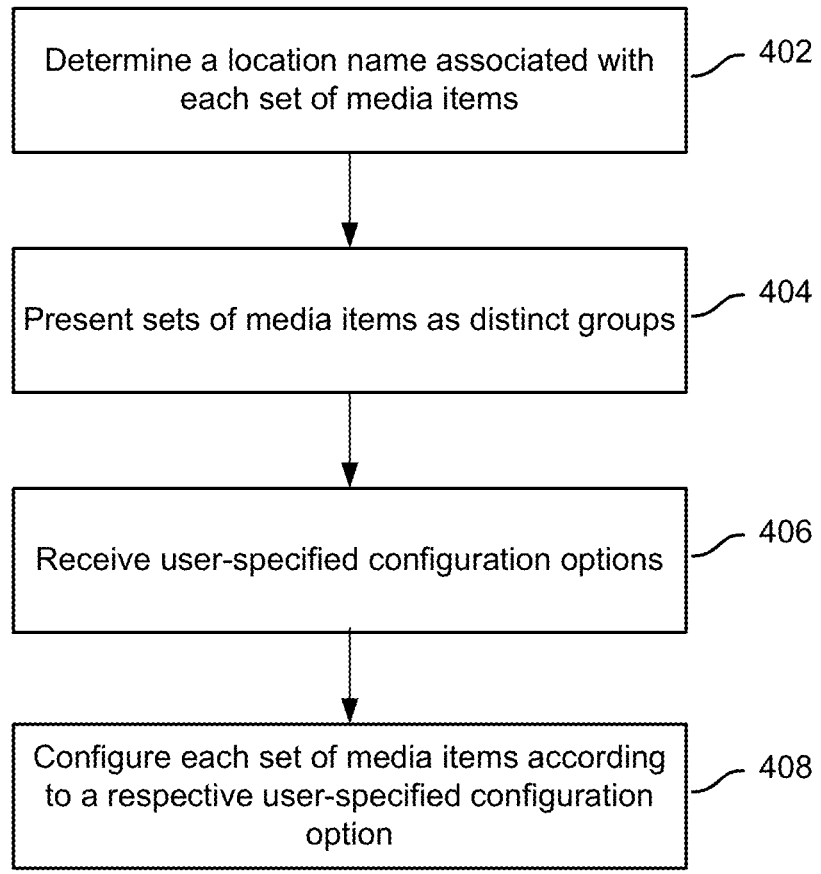
FIG. 4 is a flowchart illustrating an embodiment of a process for processing multiple sets of media items as distinct groups.

FIG. 4 is a flowchart illustrating an embodiment of a process for processing multiple sets of media items as distinct groups. Process 400 can be used to implement 312 of process 300. Although a privacy configuration option is discussed extensively below for purposes of example, the technique is also applicable to any other appropriate configuration option such as applying filters or performing other image processing or transformation to the media items.

At 402, a location name associated with each set of media items is determined. The location name is preferably a human readable alphanumerical string.

In some embodiments, each media item is potentially associated with a location name according to a geocode to location name mapping. The geocode to location name mapping can be obtained from the media manage application itself or from another application. For example, the media management application may permit the user to enter a corresponding location name (at the time the photo is taken or at a later time of the user's choosing), which is stored as metadata associated with the photo or video. As another example, a separate application such as Facebook® presents the user with the option of naming a specific location (e.g., the user's current location provided by the user's GPS-enabled device), or selecting among previously configured names to assign to the specific location. The geocode to location mapping is stored on the device locally and/or over a network, and can be obtained via appropriate API calls supported by the media management application or the third-party application. In some embodiments, the specification of a location name with a media item is optional. Until a location name is specified, the location name associated with the media item is set to null.

To determine the location name associated with a set of media items, the location names of all the items in the set are obtained (e.g., from a geocode to location mapping database), and the most common non-null location name is used. For example, in a set comprising 10 media items, if 3 items are associated with the name "Joe's Bar," 1 item is associated with the name "Al's apartment," and the rest are unnamed, then the most common non-null location name "Joe's Bar" is used as a location name for the set of media items.

At 404, sets of media items are presented as distinct groups. For example, thumbnails of media items in each set can be displayed together in a list form, along with the associated location name. Configuration options are presented at the group level as well as at the item level of the individual media items. For example, a privacy configuration option allows the user to share or keep hidden a set of media items as a group, where all the media items within the group are configured the same way. In addition, options are also available to share or keep hidden each individual media item within the group. A toggle switch is sometimes used to specify different states of the configuration options (e.g., a box indicating that the group or item is to be shared when checked, and hidden when unchecked.)

At 406, user-specified configuration options for respective sets of media items, including group level configuration specifications and/or item level configuration specifications, are received. For example, media items can be marked individually as shared or hidden, and a group of media items can also be collectively marked as shared or hidden.

At 408, each set of media items is configured according to a respective user-specified configuration option. For example, if a group of media items is marked as shared, each media item in the group would be available for viewing by other users of the system; if a group of media items are marked as hidden, each media item in the group would not be visible for viewing by other users. In some embodiments, an item level configuration specification overrides the group level configuration specification. For example, if the user has specified that a particular group is to be shared (or hidden), but a particular media item within the group is specified to be hidden (or shared), then the particular media item will be marked as hidden (or shared).

Figure 5:
FIG. 5 illustrates an example of a list of media items to be reviewed and configured according to process 300.
Figure 5:
Figure 5:
Figure 5:
Figure 5:
Figure 5:
Figure 5:
Figure 5:

FIG. 5 illustrates an example of a list of media items to be reviewed and configured according to process 300. The items in the list are sorted according to their respective timestamps, with the most recent item listed first. Each item is represented using an identifier, a geocode, a thumbnail image, and the corresponding location name. Additional information such as the full size original object/file (or a pointer or reference to the object/file) can be included as well, but are not shown in the example. Although a single table is displayed in this example, in some embodiments, the information can be stored in multiple tables (for example, a separate table can be used to store geocode to location name mappings), or stored in other data structures such as quadtree.

According to process 300, a first set of media items is located within the first region defined by the first media item (ID=1). The first 8 items are shown for purposes of example and the list can include additional items. Media items with the IDs of 1, 2, 6, and 7 are located within the first region defined by the first media item, forming a first set of media items. Another media item with the ID of 3, which is not located within the first region, defines a second region. Any media items in the list that are located within the second region are included in the second set of media items, unless the total number of items in the second set is fewer than a predefined threshold (e.g., 3 items), in which case the items in the second set are put into a pool to be further processed. Similarly, media items with the IDs of 4 and 5 do not belong to any existing region and therefore define additional regions. The remaining media items that belong to the additional regions form additional sets if possible (i.e., if the number of items in a set at least meets the predefined threshold,) or are placed in the pool to be re-processed (i.e., to form sets of media items that belong to regions of greater size). Once the media item sets are formed, the most common location name associated with each set is determined. For example, if the first media item set includes only media items 1, 2, 6, and 7, the name "The Uptown" would be chosen since it is the most common location name.

In some embodiments, a quadtree data structure in which each internal node has four children is used to store information about the media items and facilitate the process of grouping items by regions. The quadtree partitions the map space by recursively dividing it into four quadrants or regions. The media items are stored as nodes in the quadtree according to their respective locations. The representation of the media items' locations on a map in a quadtree allows for quick access of items in a particular region on the map, and offers good performance for determining which items are located within a specific region.

FIGS. 6-12 are example user interface screens according to an embodiment of location-based media item processing.

Figure 6:
FIG. 6 illustrates an example introductory screen.

FIG. 6 illustrates an example introductory screen. The screen is displayed before the user is allowed to proceed with reviewing photos and adding them to a map. The user is informed that he must choose which photos to add to his map, that locations of photos added to his map will be visible to others, and that the user can remove photos from his map at any time. The user is requested to confirm that he understands these issues before he is permitted to proceed further.

Figure 7:
FIGS. 7-8 illustrate example screens for configuring named locations.
Figure 8:
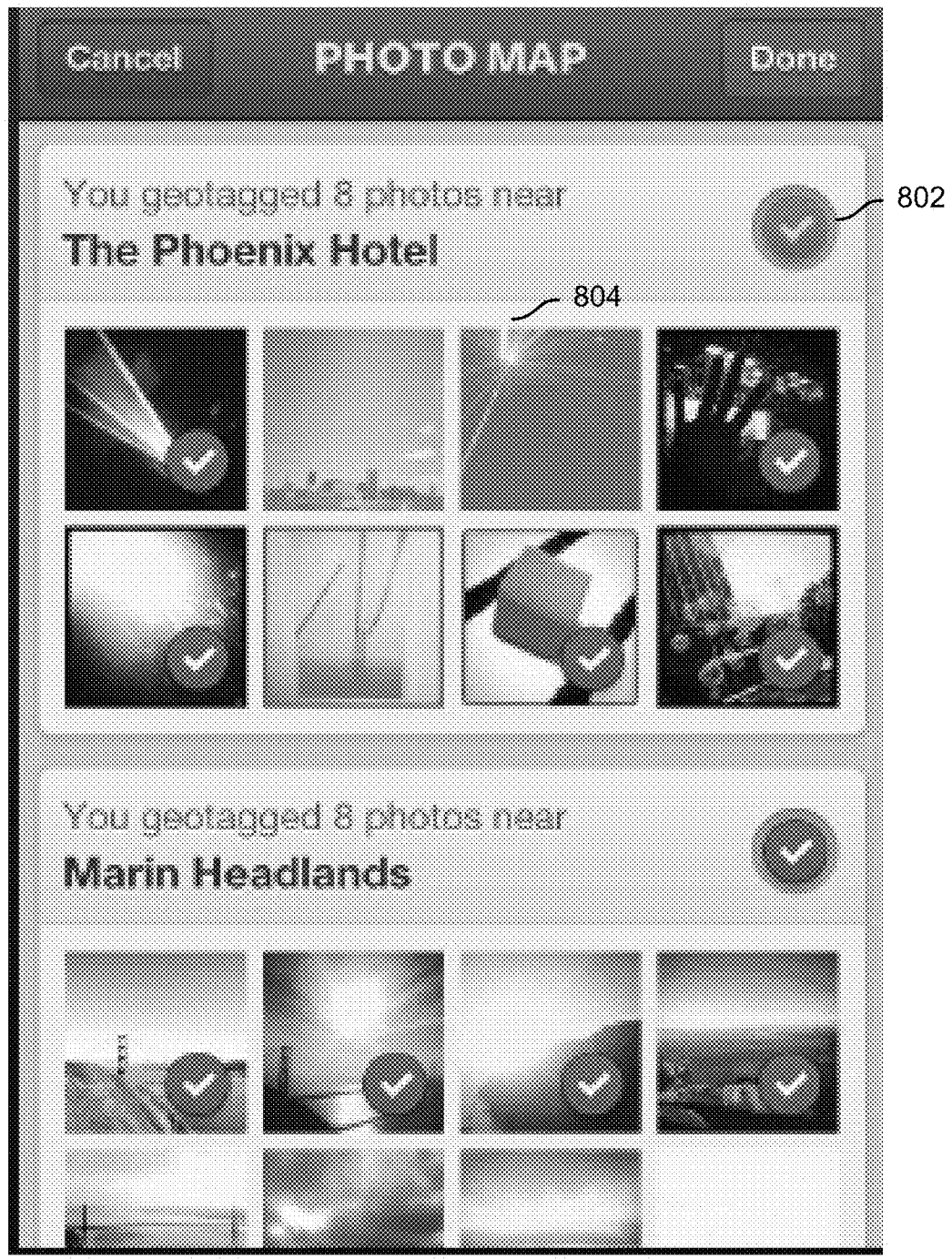

Once the user indicates that he understands the terms, the application groups the media items according to a process similar to 300, and presents sets of media items as distinct groups for user configuration. In some embodiments, groups of media items are displayed in order, and within each group thumbnails of media items are displayed in a list form. FIGS. 7-8 illustrate example screens for configuring named locations. In FIG. 7, a group of 39 photos that have geocode locations near a location named "The Uptown" is displayed in a list form. The group name is shown above the listing of the thumbnail images. The user is given the option to check a group-level button 702 to select all items in the group to add the items to the photo map, or uncheck the button to deselect all the items in the group so that none of the items are added to the photo map. The user is also given the option to check an item-level button such as 704 to select an individual item to add to the photo map, or uncheck the button to deselect an individual item to add to the photo map. Since the display size of the screen is limited, only 16 of the 39 photos are displayed initially, and the user can scroll down to review additional photos in the set, and also to review photos in other sets. FIG. 8 illustrates two additional sets of photos associated with the names "The Phoenix Hotel" and "Marin Headlands," respectively. Although the group-level button 802 is selected, some of the photos in the group (e.g., 804) are deselected and therefore will not be added to the photo map to be displayed.

Figure 9:
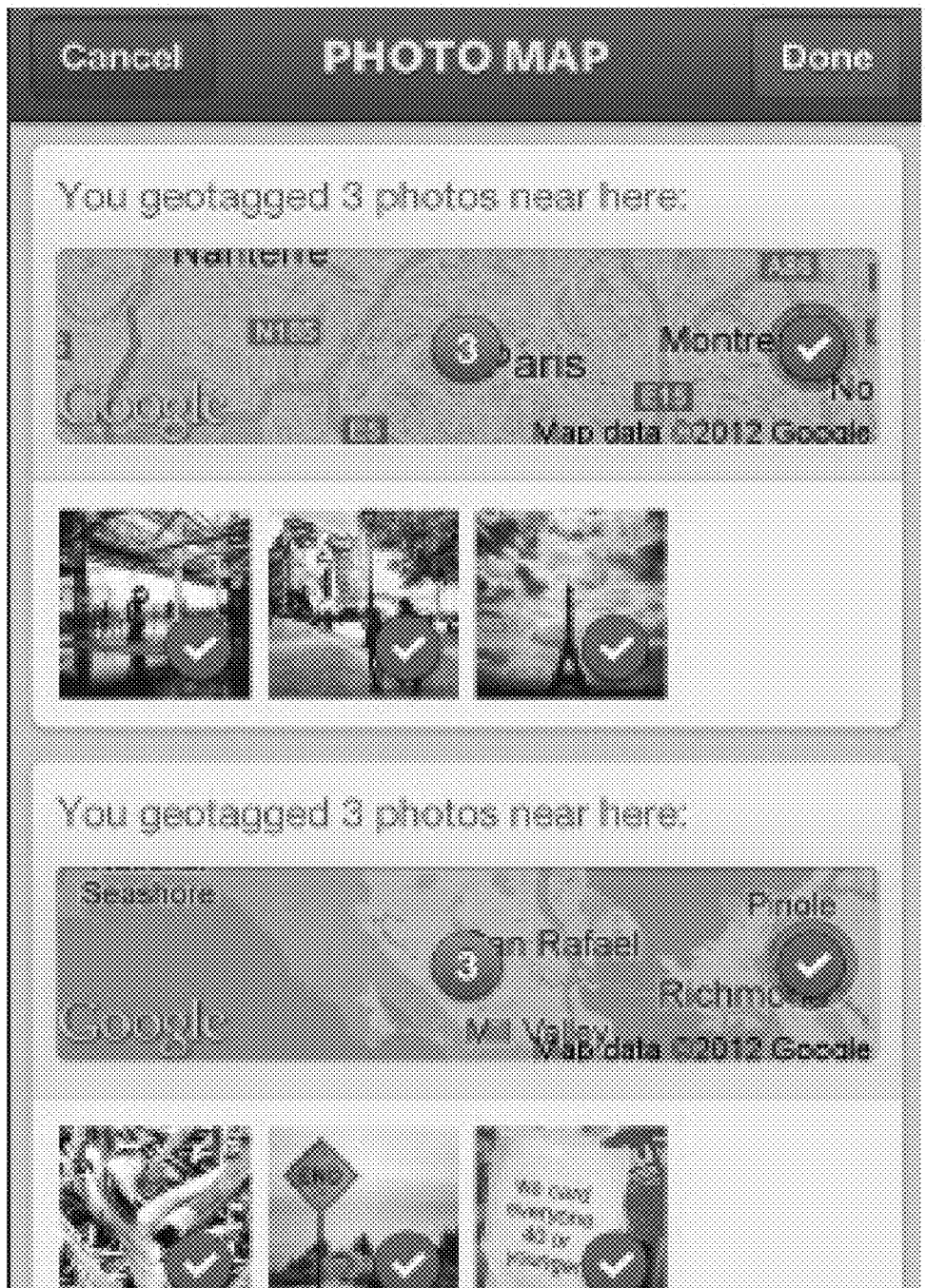
FIG. 9 illustrates an example interface screen where two sets of media items associated with two separate unnamed locations are displayed.

In some embodiments, for a media item set that is not associated with a location name (e.g., a media item set in which all the items in a set are unnamed), instead of displaying "unnamed" in place of the location name, a map region that encompasses all media items in the set is determined (e.g., based on the furthest east, south, west, and north locations of the items), and the interface displays the map region along with the number of items in this map region. FIG. 9 illustrates an example interface screen where two sets of media items associated with two separate unnamed locations are displayed. Similar to the interface for named sets of media items, the interface also provides the user with the option to select/deselect at both the group-level and the item-level.

Figure 10:
FIG. 10 illustrates an example interface screen where the user has chosen to add all his photos to his photo map.
Figure 11:
FIG. 11 illustrates an example interface screen where the user has chosen to display a subset of photos and hide others.
Figure 12:
FIG. 12 illustrates an example interface screen where the user has chosen to display none of the items to the photo map.

When the user finishes reviewing the list of media item sets, the items are added to the user's photo map. FIG. 10 illustrates an example interface screen where the user has chosen to add all his photos to his photo map. The user is informed of the number of photos to be added to his map and is asked to cancel or confirm. FIG. 11 illustrates an example interface screen where the user has chosen to display a subset of photos and hide others. The user is informed of the number of photos to be added to his map, and that the location data from the photos that he has deselected will be removed (and therefore unavailable for display on the map). FIG. 12 illustrates an example interface screen where the user has chosen to display none of the items to the photo map. In each case, once the user confirms his desire to proceed, the selected items become available for display on a photo map and can be viewed by other users, and the location information associated with unselected items is removed and the unselected items are unavailable for display on the photo map and cannot be viewed by other users.

Grouping media items by location and presenting them to the user in location-based groups for configuration and processing have been described. The technique makes it easier for the user to organize and configure the media items.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   obtaining a plurality of media items that are associated with a respective plurality of locations;
   selecting a first media item;
   defining a first region on a map, based at least in part on a property associated with a geographical location of the first media item, the defining of the first region including defining the first region's size, shape, or both;
   automatically determining, using one or more computer processors, a first set of media items located within the first region;
   selecting a second media item, the second media item being selected among media items that are not located within the first region;
   defining a second region on the map, based at least in part on a property associated with a geographical location of the second media item, the defining of the second region including defining the second region's size, shape, or both;
   determining a second set of media items located within the second region after the second region has been defined based at least in part on the property associated with a geographical location of the second media item; and
   processing the first set of media items and the second set of media items as distinct groups.

2. The method of claim 1, further comprising determining a first location name associated with the first set of media items.

3. The method of claim 2, wherein determining the first location name associated with the first set of media items includes:
   looking up geocode information associated with the first set of media items in a database storing a mapping of geocode information and corresponding location name; and
   selecting the first location name among a set of lookup results.

4. The method of claim 3, wherein the first location name is selected to be a most common location name among the set of lookup results.

5. The method of claim 1, further comprising determining that the first set of media items is not associated with a location name and displaying a map region encompassing the first set of media items, and a number of items in the map region.

6. The method of claim 1, further comprising:
   selecting one or more additional representative media items that define one or more respective additional regions, each additional representative media item not being included in either the first set of media items or the second set of media items;
   determining additional sets of media items that are located within the respective additional regions;
   including at least some of the additional sets of media items in a pool of unnamed media items;
   selecting, among the pool of unnamed media items, a first unnamed representative media item that is associated with a first unnamed region; and
   determining an unnamed set of media items located within a first unnamed location.

7. The method of claim 6, wherein the first unnamed region is greater in size than the first region defined by the first media item.

8. The method of claim 1, wherein the processing the first set of media items and the second set of media items as distinct groups includes displaying separately the first set of media items and the second set of media items.

9. The method of claim 1, wherein the processing the first set of media items and the second set of media items as distinct groups includes:
   receiving a first group-level user-specified configuration option pertaining to the first set of media items and a second group-level user-specified configuration option pertaining to the second set of media items; and
   the first group-level user-specified configuration option is different from the second group-level user-specified configuration option.

10. The method of claim 9, wherein the processing the first set of media items and the second set of media items as distinct groups further includes:
   determining whether the first set of media items is to be added to a photo map according to the first group-level user-specified configuration option; and
   determining whether the second set of media items is to be added to the photo map according to the second group-level user-specified configuration option.

11. A system, comprising:
   one or more processors to:
      obtain a plurality of media items that are associated with a respective plurality of locations;

select a first media item;
define a first region on a map, based at least in part on a property associated with a geographical location of the first media item, the defining of the first region including defining the first region's size, shape, or both;
automatically determine a first set of media items located within the first region;
select a second media item, the second media item being selected among media items that are not located within the first region;
define a second region on the map, based at least in part on a property associated with a geographical location of the second media item, the defining of the second region including defining the second region's size, shape, or both;
determine a second set of media items located within the second region after the second region has been defined based at least in part on the property associated with the geographical location of the second media item; and
process the first set of media items and the second set of media items as distinct groups; and
a memory coupled to the processor and configured to provide the processor with instructions.

12. The system of claim 11, the one or more processors further to determine a first location name associated with the first set of media items.

13. The system of claim 12, wherein to determine the first location name associated with the first set of media items includes:
look up geocode information associated with the first set of media items in a database storing a mapping of geocode information and corresponding location name; and
select the first location name among a set of lookup results.

14. The system of claim 13, wherein the first location name is selected to be the most common location name among the set of lookup results.

15. The system of claim 11, the one or more processors are further to determine that the first set of media items is not associated with a location name and to display a map region encompassing the first set of media items, and a number of items in the map region.

16. The system of claim 11, the one or more processors are further to:
select one or more additional representative media items that define one or more respective additional regions, each additional representative media item not being included in either the first set of media items or the second set of media items;
determine additional sets of media items that are located within the respective additional regions;
include at least some of the additional sets of media items in a pool of unnamed media items;
select, among the pool of unnamed media items, a first unnamed representative media item that is associated with a first unnamed region; and
determine an unnamed set of media items located within a first unnamed location.

17. The system of claim 16, wherein the first unnamed region is greater in size than the first region defined by the first representative media item.

18. The system of claim 11, wherein to process the first set of media items and the second set of media items as distinct groups includes to display separately the first set of media items and the second set of media items.

19. The system of claim 11, wherein to process the first set of media items and the second set of media items as distinct groups includes to:
receive a first group-level user-specified configuration option pertaining to the first set of media items and a second group-level user-specified configuration option pertaining to the second set of media items; and
the first group-level user-specified configuration option is different from the second group-level user-specified configuration option.

20. The system of claim 19, wherein to process the first set of media items and the second set of media items as distinct groups further includes to:
determine whether the first set of media items is to be added to a photo map according to the first group-level user-specified configuration option; and
determine whether the second set of media items is to be added to the photo map according to the second group-level user-specified configuration option.

21. A computer program product, the computer program product being embodied in a tangible non-transitory computer readable storage medium and comprising computer instructions for:
obtaining a plurality of media items that are associated with a respective plurality of locations;
selecting a first media item;
defining a first region on a map, based at least in part on a property associated with a geographical location of the first media item, the defining of the first region including defining the first region's size, shape, or both;
automatically determining a first set of media items located within the first region;
selecting a second media item, the second media item being selected among media items that are not located within the first region;
defining a second region on the map, based at least in part on a property associated with a geographical location of the second media item, the defining of the second region including defining the second region's size, shape, or both;
determining a second set of media items located within the second region; and
processing the first set of media items and the second set of media items as distinct groups.

22. The method of claim 1, wherein:
the first set of media items located within the first region and the second set of media items located within the second region are configured with different configuration options indicating whether to share or keep private respective sets of media items, wherein:
a set of media items that is configured to be shared is viewable by at least one user other than an owner of the shared sets of media items,
a set of media items that is configured to be private is viewable only by an owner of the private sets of media items, and
the processing the first set of media items and the second set of media items includes sharing or keeping private the first set of media items and the second set of media items according to their respective sharing options.

23. The system of claim 11, wherein:
the first set of media items located in the first region and the second set of media items located in the second region are configured with different sharing options indicating whether to make the respective set of media items (i) viewable by at least one user other than an owner of the respective set of media items or (ii) viewable only by an owner of the respective sets of media items, and
to process the first set of media items and the second set of media items includes to share or keep private the first set of media items and the second set of media items according to their respective sharing options.

* * * * *